United States Patent
Bates et al.

(10) Patent No.: US 7,971,126 B2
(45) Date of Patent: Jun. 28, 2011

(54) APPARATUS, SYSTEM, AND METHOD FOR HARD DISK DRIVE REDUNDANCY

(75) Inventors: Allen K. Bates, Tucson, AZ (US); Nils Haustein, Soergenloch (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 11/769,623

(22) Filed: Jun. 27, 2007

(65) Prior Publication Data
US 2009/0006891 A1    Jan. 1, 2009

(51) Int. Cl.
*G11C 29/00* (2006.01)
(52) U.S. Cl. ............... 714/770; 714/6; 714/11; 711/114
(58) Field of Classification Search ............ 714/770, 714/6, 11; 711/114
See application file for complete search history.

(56) References Cited

U.S. PATENT DOCUMENTS

| | | | | |
|---|---|---|---|---|
| 5,623,595 | A * | 4/1997 | Bailey | 714/6 |
| 5,948,110 | A * | 9/1999 | Hitz et al. | 714/6 |
| 7,043,605 | B2 * | 5/2006 | Suzuki | 711/114 |
| 7,073,115 | B2 * | 7/2006 | English et al. | 714/770 |
| 7,080,278 | B1 * | 7/2006 | Kleiman et al. | 714/6 |
| 7,328,305 | B2 * | 2/2008 | Kleiman et al. | 711/114 |
| 7,509,525 | B2 * | 3/2009 | Kleiman et al. | 714/6 |
| 7,640,484 | B2 * | 12/2009 | Corbett et al. | 714/770 |

* cited by examiner

*Primary Examiner* — Esaw T Abraham
(74) *Attorney, Agent, or Firm* — Kunzler Needham Massey & Thorpe

(57) ABSTRACT

An apparatus, system, and method are disclosed for hard disk drive redundancy. A demarcation module demarks a parity data block in each set of a specified number of data blocks on a hard disk drive. An association module associates a PBA of each un-demarked data block with a LBA. A write module writes the data to the un-demarked data blocks. A parity module calculates parity data for the data written to the un-demarked data blocks and the write module writes the parity data to the parity data block.

20 Claims, 5 Drawing Sheets

APPARATUS, SYSTEM, AND METHOD FOR HARD DISK DRIVE REDUNDANCY

BACKGROUND OF THE INVENTION

1. Field of the Invention

This invention relates to hard disk drives and more particularly relates to hard disk drive redundancy.

2. Description of the Related Art

Data storage systems are storing increasing quantities of data for both organizations and individuals. Much information is stored in databases. In addition, the cost of storing information digitally is often significantly lower than storing paper copies. As a result, vast amounts of valuable information are stored digitally.

Because of the high value of digital information, it is important that digitally stored information is protected from loss. Data storage systems often store data redundantly to protect against loss. For example, a hard disk drive may employ error correction codes (ECC) to redundantly store data. The ECC may be used to recover lost data in a sector due to write errors, faulty media, and the like.

Unfortunately, if there are too many errors, the ECC is unable to recover the data. As a result, a data storage system may store data redundantly across a plurality of hard disk drives. For example, a data storage system may employ Redundant Arrays of Independent Disks (RAID) systems to store data redundantly.

In a RAID system, if a hard disk drive fails, the data of the hard disk drive may still be recovered from other drives in the system. RAID systems using RAID level 3, 4, and 5 redundancy utilize row parity between hard disk drives. RAID level 6 supports row and diagonal parity between hard disk drives.

However, these RAID redundancy schemes are still exposed to individual sector failures, which can kill an entire data stripe during the reconstruction of a failed drive. In addition, individual hard disk drives would be more reliable if the drives supported greater redundancy.

SUMMARY OF THE INVENTION

From the foregoing discussion, there is a need for an apparatus, system, and method for hard disk drive redundancy. Beneficially, such an apparatus, system, and method would increase hard disk drive redundancy.

The present invention has been developed in response to the present state of the art, and in particular, in response to the problems and needs in the art that have not yet been fully solved by currently available redundancy methods. Accordingly, the present invention has been developed to provide an apparatus, system, and method for hard disk drive redundancy that overcome many or all of the above-discussed shortcomings in the art.

The apparatus for hard disk drive redundancy is provided with a plurality of modules configured to functionally execute the steps of demarking a parity data block, associating Physical Block Addresses (PBA) with Logical Block Addresses (LBA), receiving data from a host, translating each LBA to a PBA, writing data to un-demarked data blocks, calculating parity data, and writing parity data to parity data block. These modules in the described embodiments include a demarcation module, an association module, a write module, and a parity module.

The demarcation module is configured to demark a parity data block in each set of a specified number of data blocks on a hard disk drive. The association module is configured to associate a PBA of each un-demarked data block with a LBA. The write module writes data to the un-demarked data blocks. The parity module calculates parity data for the data written to the un-demarked data blocks and the write module further writes the parity data to the parity data block.

In one embodiment, the apparatus includes an input/output (I/O) module that receives data from a host. The received data is directed to the LBAs of the un-demarked data blocks. A translation module translates the LBAs of the data to the PBAs for the un-demarked data blocks.

In an alternate embodiment, the I/O module receives a read request from the host and the translation module translates the LBAs of the read request to PBAs for the un-demarked data blocks. A read module may read the requested data from the un-demarked data blocks and read the parity data from the parity data block. The parity module determines if the requested data is valid using the parity data and corrects the requested data using the parity data if the requested data is invalid.

The least significant bits in a parity data block PBA may demark the parity data block. The parity data block PBA may demark the parity data block when three or four least significant bits are binary ones. Each parity data block is transparent to the host. Each set of the specified number of data blocks may comprises data blocks with contiguous PBAs. Redundancy is achieved in the hard disk drive (HDD) at the physical block level and hence improves the robustness of a single HDD whether the HDD is used singularly or in a RAID array.

A system of the present invention is also presented for hard disk redundancy. The system for hard disk redundancy includes a host, a HDD comprising a processor module, a demarcation module, an association module, an I/O module, a translation module, a write module and a parity module. The demarcation module is configured to demark a parity data block in each set of a specified number of data blocks on a hard disk drive.

The association module is configured to associate a PBA of each un-demarked data block with a LBA. The write module writes data to the un-demarked data blocks. The parity module calculates parity data for the data written to the un-demarked data blocks and the write module further writes the parity data to the parity data block.

A method of the present invention is also presented for hard disk redundancy. The method in the disclosed embodiments substantially includes the steps to carry out the functions presented above with respect to the operation of the described apparatus and system. In one embodiment, the method includes demarking a parity data block, associating PBAs with LBAs, receiving data from host, translating each LBA to a PBA, writing data to un-demarked data blocks, calculating parity data, and writing parity data to parity data block.

A demarcation module demarks a parity data block in each set of a specified number of data blocks on a hard disk drive. An association module associates a PBA of each un-demarked data block with a LBA. A write module writes the data to the un-demarked data blocks. A parity module calculates parity data for the data written to the un-demarked data blocks and the write module writes the parity data to the parity data block.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The invention enables a hard disk to recover single sector hard errors. The HDD provides parity on its own PBA's within the HDD itself, invisible to the host and control unit by use of a parity scheme and thus the HDD can overcome hard disk failures. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
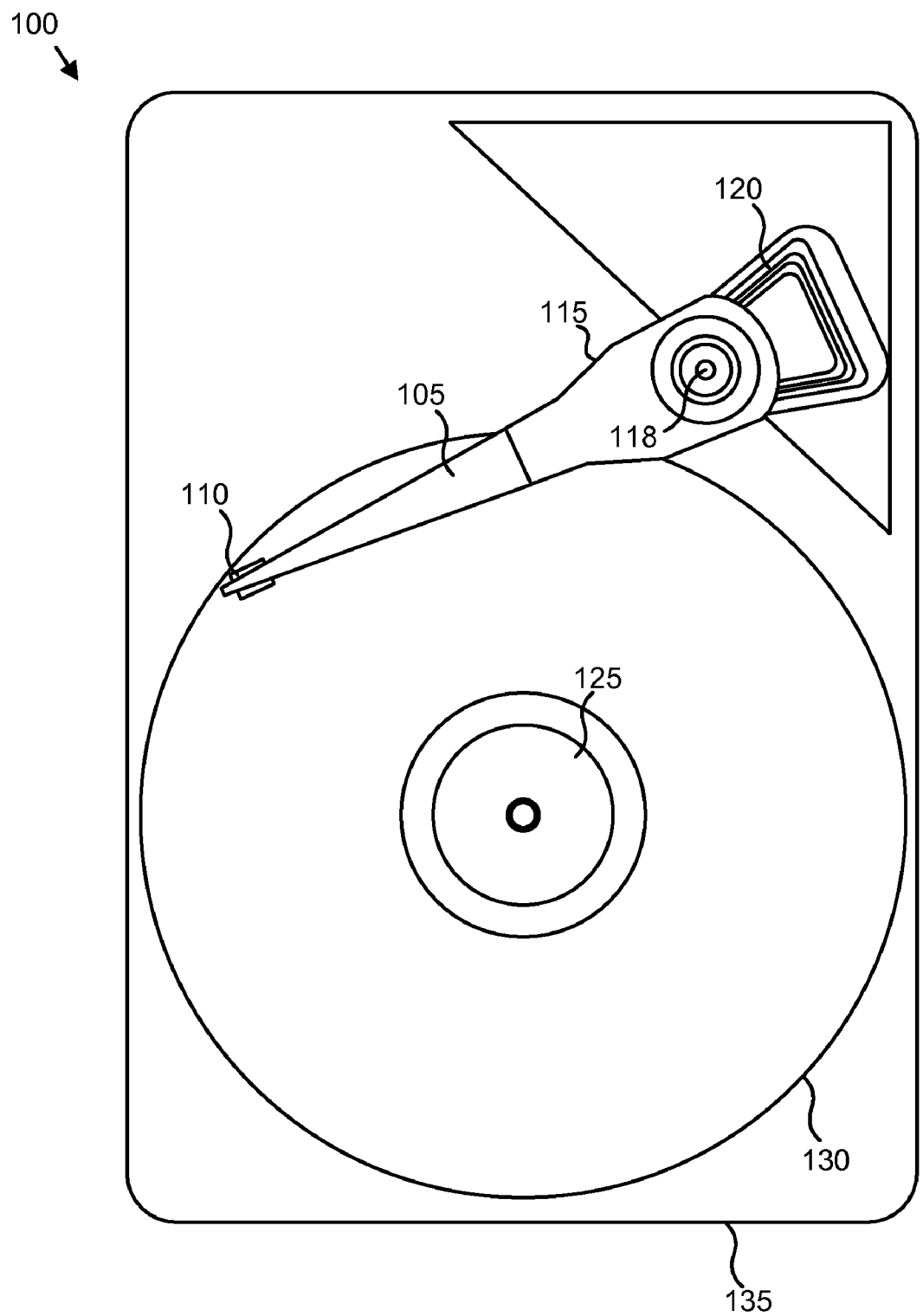
FIG. 1 is a top view drawing illustrating one embodiment of a hard disk drive in accordance with the present invention.

FIG. 1 is a top view drawing illustrating one embodiment of a HDD 100 in accordance with the present invention. The HDD 100 includes a plurality of write channels. Each write channel may include a read-write head 110 mounted on a corresponding actuator arm 105 and at least one flat circular disk called a platter or hard disk 130. A plurality of hard disks 130 may be connected to a spindle 125 resting on a platform 135 and may be rotated by a motor (not shown), or the like, at very high speeds. About pivot 118, actuator 115, motivated by a voice coil 120, rotates one or more actuator arms 105.

The hard disk 130 of the HDD 100 may be primarily made from a non-magnetic material such as glass or aluminum and coated with a thin layer of magnetic materials such as Cobalt-based alloy or Iron (III) oxide. The plurality of hard disks 130 may store analog data by frequency modulation method or by any other similar method. The frequency modulation method used may convert the data into a form of binary digits.

The voice coil 120 motivates the actuator arm 105 to move the read-write head 110 in an arc, geometrically centered about pivot 118, across each hard disk 130, as the hard disks 130 spin, allowing the read-write head 110 to access the entire data surface of the hard disk 130. The read-write head 110 in close proximity of the hard disk 130 may write the data by magnetizing the magnetic material of the platter 130. One (1) read-write head 110 may be used for each hard disk 130. The write head portion of read-write head 110 of the HDD 100 may be of the Metal in Gap (MIG) type, Thin Film (TF) type, or the like. The read head portion of read-write head 110 of the HDD 100 may be of the Magneto-Resistive (MR), Giant Magneto-Resistive (GMR), Tunnel Magneto-Resistive (TMR), or Current Perpendicular to the Planes (CPP) type, or the like.

Figure 2:
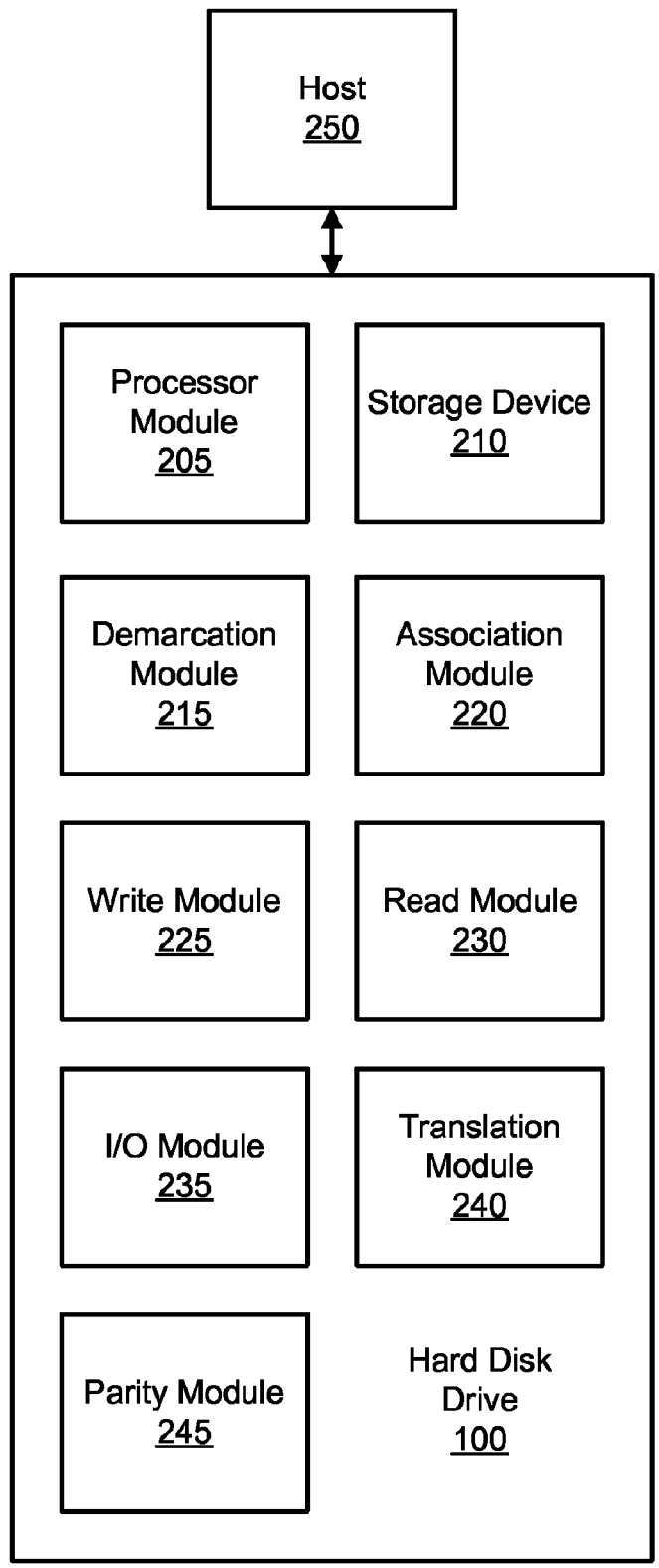
FIG. 2 is a schematic block diagram illustrating one embodiment of a hard disk drive of the present invention.

FIG. 2 is a schematic block diagram illustrating one embodiment of a HDD 100 of the present invention. The HDD 100 shows functional elements of the HDD 100 of FIG. 1. The HDD 100 includes a demarcation module 215, association module 220, write module 225, read module 230, parity module 245, I/O module 235 and translation module 240.

The demarcation module 215 is configured to demark a parity data block in each set of a specified number of data blocks on the HDD 100. The association module 220 is configured to associate a PBA of each un-demarked data block with a LBA. The write module 225 writes data to the un-demarked data blocks. The parity module 245 calculates parity data for the data written to the un-demarked data blocks and the write module 225 further writes the parity data to the parity data block.

In one embodiment the HDD 100 includes an input/output (I/O) module 235 with semiconductor logic that receives data from a host 250. For example, the semiconductor logic used may interface with a data bus, latch data values from the bus, and/or drive data values to the bus. The received data is directed to the LBAs of the un-demarked data blocks. A translation module 240 translates the LBAs of the data to the PBAs for the un-demarked data blocks.

In an alternate embodiment the I/O module 235 receives a read request from the host 250 and the translation module 240 translates the LBAs of the read request to PBAs for the un-demarked data blocks. A read module 230 may read the requested data from the un-demarked data blocks and read the parity data from the parity data block. The parity module 245 may determine if the requested data is valid using the parity data and correct the requested data using the parity data if the requested data is invalid.

In one embodiment, the least significant bits in a parity data block PBA demark the parity data block. In this regard, a parity data block PBA is a PBA where the parity data is stored. For example, every PBA ending in hexadecimal "F" may be a parity PBA. In that case, every sixteenth PBA may contain parity and the hard disk drive 100 can easily identify its own parity data block PBA. This may result in a reduction of capacity of one by sixteenth ($\frac{1}{16}$) or six point twenty five percentage (6.25%.) Alternatively, the parity data block PBA may demark the parity data block when three (3) least significant bits are binary ones.

Each parity data block is transparent to the host 250. As is known to one skilled in the art, a parity block is used by certain RAID levels. Redundancy is achieved by the use of parity blocks. If a single HDD 100 has a read failure, data blocks and a parity block within that HDD 100 can be combined to reconstruct the missing data.

Each set of the specified number of data blocks may comprise data blocks with contiguous PBAs. In an alternate embodiment, a reconstructed PBA may use spare sector PBA's. In this way the defective PBA is reallocated to a spare sector PBA and that reallocation is tracked within the HDD's defective sector table. Both spare sectors and a defective sector table may be incorporated in the HDD 100. Redundancy is achieved in the HDD 100 at the physical block level and hence improves the robustness of a single HDD 100 whether the HDD 100 is used singularly or in a RAID array.

The HDD 100 also includes a processor module 205 and a storage module 210. The storage module 210 may store data and computer readable programs on a tangible storage medium. The processor module 205 may execute the computer readable programs. In one embodiment, the demarcation module 215, association module 220, write module 225, read module 230, parity module 245, and translation module 240 comprise computer readable programs stored in the storage device 210 and executed on the processor module 205.

Figure 3:
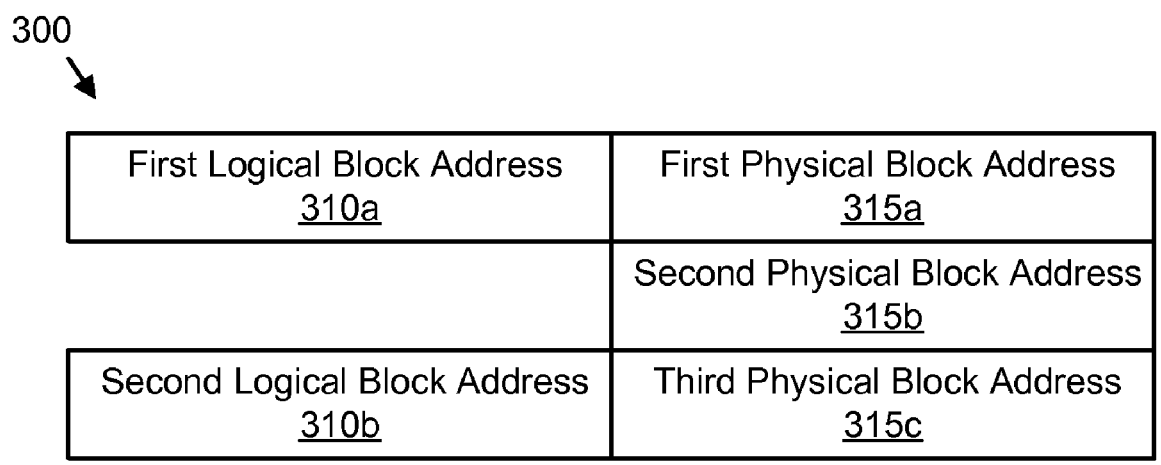
FIG. 3 is a schematic block diagram illustrating one embodiment of a translation table of the present invention.

FIG. 3 is a schematic block diagram illustrating one embodiment of a translation table 300 of the present invention. The translation table 300 shows the one or more LBA 310 and one or more PBA 315. Instead of referring to a cylinder, head and sector number, each sector is instead assigned a unique "sector number". In essence, the sectors are numbered 0, 1, 2, etc. up to (N−1), where N is the number of sectors on the disk.

The translation table 300 maps a given LBA 310 to a PBA 315 where the valid data reside. Each LBA 310 is mapped to an un-demarked PBA 315. Demarked PBAs 315 are not mapped to LBAs 310. For example, a second PBA 315b may be a parity data block and so is not mapped to an LBA 310. A PBA 315 usually denotes a disk sector. The translation table 300 is indexed by LBA 310 and each entry of the table 300 contains the PBA 315 of the corresponding LBA 310.

The addressing scheme for PBAs 315 versus LBAs 310 would change for HDDs 100 depending whether parity PBAs, such as the second PBA 315b, are present. For example, Equation 1 may be used to calculate a current LBA as a function of PBA addressing elements, when no parity PBAs are present on disk 130 of HDD 100:

$$LBA=[(cylinder*no.\ of\ heads+heads)*sectors/track]+ (sector-1) \qquad \text{Equation 1}$$

When there are parity PBAs on disk 130 of HDD 100 at every $16^{th}$ sector, the new LBA 310 versus PBA 315 addressing is shown below in Equation 2, where the $INT_F$ function is the Integer function of the quotient of the PBA 315 divided by hexadecimal "F." In this way, the host 250 does not see a break in the LBAs 310 due to a parity PBA every "F" (16) sectors, and the host 250 can never access or alter a parity PBA 315, as the addressing algorithm skips over those parity PBAs 315.

$$LBA=[(cylinder*no.\ of\ heads+heads)*sectors/track]+ (sector-1)-INT_F(sector) \qquad \text{Equation 2}$$

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
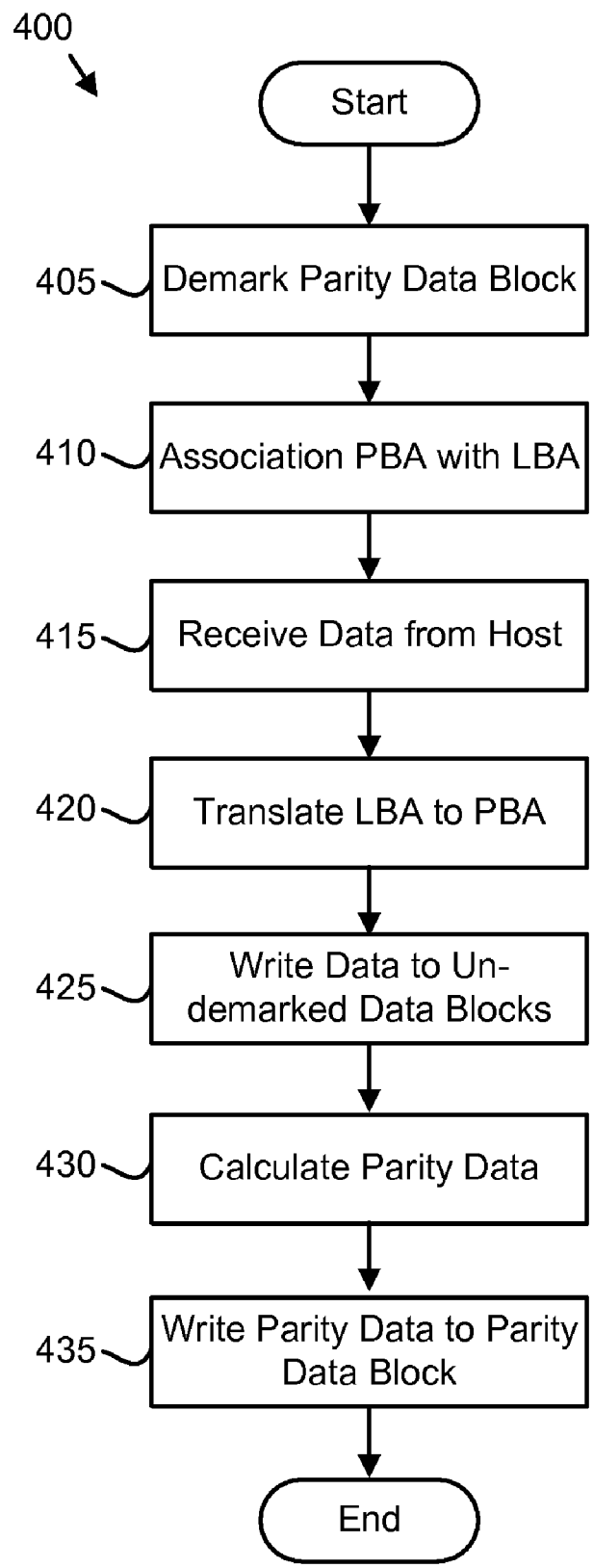
FIG. 4 is a schematic flow chart diagram illustrating one embodiment of a redundant write method of the present invention.

FIG. 4 is a schematic flow chart diagram illustrating one embodiment of a redundant write method 400 of the present invention. The method 400 substantially includes the steps to carry out the functions presented above with respect to the operation of the described apparatus and system of FIGS. 1-3. The description of the method 400 refers to elements of FIGS. 1-3, like numbers referring to like elements. In one embodiment, the method 400 is implemented with a computer program product comprising a computer readable medium having a computer readable program. The computer readable program may be integrated into a processor of the HDD 100, wherein the program in combination with the processor is capable of performing the method 400.

The redundant write method 400 begins and the demarcation module 215 demarks 405 a parity data block in each set of a specified number of data blocks on the HDD 100. For example, the least significant bits in the PBA address may be utilized to demark the parity PBAs 315. In this regard, a parity PBA is a PBA 315 where the parity data is stored. For example, every PBA 315 ending in hexadecimal "F" would be a parity PBA 315. Thus, every "XXXXXXXF" PBA 315 contains parity data, and the HDD 100 would easily identify its own parity PBAs 315. In binary, every "XXXXXXX1111" PBA 315 contains parity data. Thus, every sixteenth ($16^{th}$) PBA would contain parity.

The association module 230 associates 410 PBAs 315 of each un-demarked data block with LBAs 310. For example, each LBA 310 is mapped to an un-demarked PBA 315. Demarked PBAs 315 are not mapped to an LBA 310. For example, in FIG. 3, the second PBA 315b may be demarked and so is not mapped to an LBA 310. The new LBA 310 versus PBA 315 addressing may be calculated using Equation 2, where the $INT_F$ function is the Integer function of the quotient of the PBA 315 divided by hexadecimal "F."

The I/O module 235 receives 415 data from the host 250. For example, the I/O module 235 first receives a storage request from the host 250. This request typically includes multiple packets of data, and a LBA 310 identifying these packets. Specifically, the host 250 may provide the LBA 310 and length of the data. This LBA 310 is noted by the HDD 100 and utilized for further mapping operations. The translation module 240 translates 420 the LBA 310 to a PBA 315. The actual address translation takes place utilizing an address translation structure and equations, such as Equation 2. The data packets provided are stored to the disk at the designated PBAs 315.

The write module 225 writes 425 data to un-demarked data blocks. For example, the write module 225 may write 425 the packets of data to the HDD 100 beginning at the first PBA 315a of FIG. 3 corresponding to the first LBA 310a.

The parity module 245 calculates 430 parity data. For example, adjacent PBAs 315 may be utilized in the parity calculation and interleaving is possible. The data value for a parity PBA 315 "XXXXXXXXF" may be calculated as (XXXXXXX0) <xor> (XXXXXXX1) <xor> (XXXXXXX2) <xor> (XXXXXXX3) <xor> (XXXXXXX4) <xor> (XXXXXXX5) <xor> (XXXXXXX6) <xor> (XXXXXXX7) <xor> (XXXXXXX8) <xor> (XXXXXXX9) <xor> (XXXXXXXA) <xor> (XXXXXXXB) <xor> (XXXXXXXC) <xor> (XXXXXXXD) <xor> (XXXXXXXE) where the hexadecimal number in parenthesis represents the address of data used in the operation. The write module 225 writes 435 parity data to parity data block and the method 400 ends.

Figure 5:
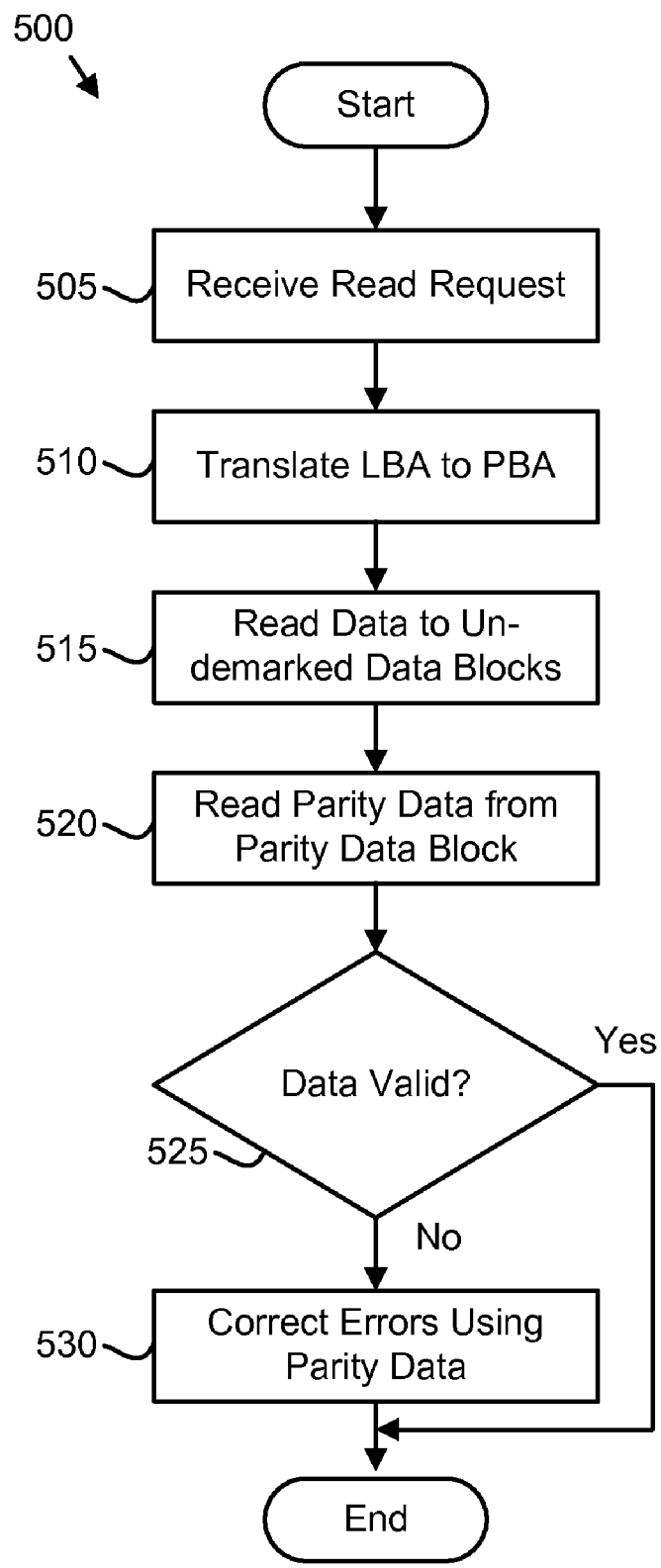
FIG. 5 is a schematic flow chart diagram illustrating one embodiment of a redundant read method of the present invention.

FIG. 5 is a schematic flow chart diagram illustrating one embodiment of a redundant read method 500 of the present invention. The method 500 substantially includes the steps to carry out the functions presented above with respect to the operation of the described apparatus and system of FIGS. 1-3. The description of the method 500 refers to elements of FIGS. 1-3, like numbers referring to like elements. In one embodiment, the method 500 is implemented with a computer program product comprising a computer readable medium having a computer readable program. The computer readable program may be integrated into a processor of the HDD 100, wherein the program in combination with the processor is capable of performing the method 500.

The read method 500 begins and the I/O module 235 receives 505 read request. For example, the I/O module 235 first receives a read request from the host 250. This request typically includes multiple packets of data, and a LBA 310 identifying these packets. Specifically, the host 250 may provide the LBA 310 and length of the data. This LBA 310 is noted by the HDD 100 and utilized for further mapping operations.

The translation module translates 510 a LBA 310 to a PBA 315. The actual address translation takes place utilizing the address translation structure and equations. The data packets provided are stored to the HDD 100 at the designated PBAs 315.

The read module 230 may read 515 the requested data from the un-demarked data blocks and read 520 the parity data from the parity data block. For example, the read module 230 may read 515 the packets of data from the HDD 100 beginning at the first PBA 315a corresponding to the first LBA 310a received with the data. The read module 230 may read 520 the parity data connected with each data packet from the demarked PBA 315. For example, the read module 230 may read 520 the parity data from the second PBA 315b.

The parity module 245 may 525 determine if the requested data is valid using the parity data. If the data is not valid, the parity module corrects 530 the requested data using the parity data if the requested data is invalid and the method 500 is ended.

For example, the reconstruction of the entire defective PBA 315 at address (XXXXXXX9) may be the result of (XXXXXXX0) <xor> (XXXXXXX1) <xor> (XXXXXXX2) <xor> (XXXXXXX3) <xor> (XXXXXXX4) <xor> (XXXXXXX5) <xor> (XXXXXXX6) <xor> (XXXXXXX7) <xor> (XXXXXXX8) <xor> <xor> (XXXXXXXA) <xor> (XXXXXXXB) <xor> (XXXXC) <xor> (XXXXD) <xor> (XXXXXXXE) <xor> (XXXXXXXF). The reconstructed data for PBA XXXXXXX9 is stored in a spare sector PBA 315 on the same HDD 100, and the defective sector table updated. This way, the defective PBA 315 at address XXXXXXX-9 is being reallocated to a spare sector PBA 315 automatically.

This reconstruction is not limited to entire PBAs 315. It could include bit-wise reconstruction across several PBAs 315. It is important to note that this bit-wise reconstruction need not fix every errant bit. All this bit-wise reconstruction need do is to reduce the number of errant bits to fall within the Hamming radius of the Error Correction Code (ECC) in each PBA 315. Then, the ECC can repair the rest of the damage.

If the data is valid the method 500 ends. In an alternate embodiment, the step 525 of determining if the data is valid comes before the step 520 of reading the parity data from the parity data block.

Since RAID parity is adopted at the physical block level within the HDD 100 the robustness of the HDD 100 is improved whether the HDD 100 is used singularly or in a RAID array. Reconstruction of a defective PBA 315 is done to a spare sector PBA 315. This automatically causes the reallocation of defective PBA 315 and the tracking of that reallocation in the defective sector table. This method also ensures bit-wise reconstruction across several PBAs 315.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. An apparatus for hard disk drive redundancy, the apparatus comprising:

a demarcation module comprising a computer readable program stored on a tangible storage medium, executed by a processor, and configured to demark a parity data block in a set of data blocks on a hard disk drive;

an association module comprising a computer readable program stored on the tangible storage medium, executed by the processor, and configured to associate a physical block address (PBA) of each un-demarked data block in the set of data blocks with a logical block address (LBA);

a write module comprising a computer readable program stored on the tangible storage medium, executed by the processor, and configured to write data to the un-demarked data blocks;

a parity module comprising a computer readable program stored on the tangible storage medium, executed by the processor, and configured to calculate parity data for the data written to the un-demarked data blocks; and the write module further configured to write the parity data to the parity data block.

2. The apparatus of claim 1, the apparatus further comprising:
an input/output (I/O) module comprising semiconductor logic and configured to receive the data from a host, wherein the data is directed to the LBAs of the un-demarked data blocks; and
a translation module configured to translate the LBAs of the data to the PBAs for the un-demarked data blocks.

3. The apparatus of claim 2, wherein:
the I/O module is further configured to receive a read request from the host;
the translation module is further configured to translate LBAs of the read request to PBAs for the un-demarked data blocks;
the apparatus comprises a read module comprising a computer readable program stored on the tangible storage medium, executed by the processor, and configured to read the requested data from the un-demarked data blocks and read the parity data from the parity data block; and
the parity module is configured to determine if the requested data is valid using the parity data and correct the requested data using the parity data if the requested data is invalid.

4. The apparatus of claim 1, wherein least significant bits in a parity data block PBA demark the parity data block.

5. The apparatus of claim 4, wherein the parity data block PBA demarks the parity data block when four least significant bits are binary ones.

6. The apparatus of claim 4, wherein the parity data block PBA demarks the parity data block when three least significant bits are binary ones.

7. The apparatus of claim 1, wherein each parity data block is transparent to the host.

8. The apparatus of claim 1, wherein each set of the specified number of data blocks comprises data blocks with contiguous PBAs.

9. A computer program product embodied on a computer-readable medium and comprising computer readable program, that when executed by a processor causes a computer to perform the following:
demark a parity data block in a set of data blocks on a hard disk drive;
associate a physical block address (PBA) of each un-demarked data block in the set of data blocks with a logical block address (LBA);
write data to the un-demarked data blocks;
calculate parity data for the data written to the un-demarked data blocks; and
write the parity data to the parity data block.

10. The computer program product of claim 9, wherein the computer readable program are further configured to cause the computer to:
receive the data from a host, wherein the data is directed to the LBAs of the un-demarked data blocks; and
translate the LBAs of the data to the PBAs for the un-demarked data blocks.

11. The computer program product of claim 10, wherein the computer readable program are further configured to cause the computer to:
receive a read request from the host;
translate LBAs of the read request to PBAs for the un-demarked data blocks;
read the requested data from the un-demarked data blocks;
read the parity data from the parity data block;
determine if the requested data is valid using the parity data; and
correct the requested data using the parity data if the requested data is invalid.

12. The computer program product of claim 9, wherein least significant bits in a parity data block PBA demark the parity data block.

13. The computer program product of claim 12, wherein the parity data block PBA demarks the parity data block when four least significant bits are binary ones.

14. The computer program product of claim 12, wherein the parity data block PBA demarks the parity data block when three least significant bits are binary ones.

15. The computer program product of claim 9, wherein each parity data block is transparent to the host.

16. The computer program product of claim 9, wherein each set of the specified number of data blocks comprises data blocks with contiguous PBAs.

17. A system for hard disk redundancy, the system comprising:
a host;
a hard disk drive comprising
a processor module;
a demarcation module comprising a computer readable program stored on a tangible storage medium, executed by the processor, and configured to demark a parity data block in a set of data blocks on a hard disk drive;
an association module comprising a computer readable program stored on the tangible storage medium, executed by the processor, and configured to associate a physical block address (PBA) of each un-demarked data block in the set of data blocks with a logical block address (LBA);
an I/O module comprising semiconductor logic and configured to receive data from the host, wherein the data is directed to the LBAs of the un-demarked data blocks;
a translation module comprising a computer readable program stored on the tangible storage medium, executed by the processor, and configured to translate the LBAs of the data to PBAs for the un-demarked data blocks;
a write module comprising a computer readable program stored on the tangible storage medium, executed by the processor, and configured to write the data to the un-demarked data blocks;
a parity module comprising a computer readable program stored on the tangible storage medium, executed by the processor, and configured to calculate parity data for the data written to the un-demarked data blocks; and
the write module further configured to write the parity data to the parity data block.

18. The system of claim 17, wherein:
the I/O module is further configured to receive a read request from the host;
the translation module is further configured to translate LBAs of the read request to PBAs for the un-demarked data blocks;
the hard disk drive comprises a read module comprising a computer readable program stored on the tangible storage medium, executed by the processor, and configured to read the requested data from the un-demarked data blocks and read the parity data from the parity data block; and the parity module is further configured to determine if the requested data is valid using the parity data and correct the requested data using the parity data if the requested data is invalid.

19. The system of claim 17, wherein least significant bits in a parity data block PBA demark the parity data block.

20. The system of claim 19, wherein the parity data block PBA demarks the parity data block when four least significant bits are binary ones.

* * * * *